(12) United States Patent
Scott et al.

(10) Patent No.: US 9,553,768 B2
(45) Date of Patent: Jan. 24, 2017

(54) DETERMINING, WITHOUT USING A NETWORK, WHETHER A FIREWALL WILL BLOCK A PARTICULAR NETWORK PACKET

(71) Applicant: Illumio, Inc., Sunnyvale, CA (US)

(72) Inventors: Jerry B. Scott, Los Altos, CA (US); Daniel R. Cook, San Jose, CA (US); Paul J. Kirner, Palo Alto, CA (US)

(73) Assignee: Illumio, Inc., Sunnyvale, CA (US)

( * ) Notice: Subject to any disclaimer, the term of this patent is extended or adjusted under 35 U.S.C. 154(b) by 54 days.

(21) Appl. No.: 14/531,832

(22) Filed: Nov. 3, 2014

(65) Prior Publication Data

US 2015/0128212 A1    May 7, 2015

Related U.S. Application Data

(60) Provisional application No. 61/899,468, filed on Nov. 4, 2013.

(51) Int. Cl.
*G06F 17/00*  (2006.01)
*H04L 12/24*  (2006.01)
*H04L 29/06*  (2006.01)

(52) U.S. Cl.
CPC ....... *H04L 41/0893* (2013.01); *H04L 63/0263* (2013.01); *H04L 63/08* (2013.01); *H04L 63/10* (2013.01); *H04L 63/102* (2013.01); *H04L 63/20* (2013.01); *H04L 63/02* (2013.01); *H04L 63/0227* (2013.01)

(58) Field of Classification Search
CPC .... H04L 41/0892; H04L 63/08; H04L 63/102; H04L 63/20; H04L 29/06557; H04L 63/02; H04L 63/0227; H04L 29/06578

USPC .................................................. 726/11–13, 1
See application file for complete search history.

(56) References Cited

U.S. PATENT DOCUMENTS

| | | | |
|---|---|---|---|
| 6,023,765 A | 2/2000 | Kuhn | |
| 6,625,764 B1 * | 9/2003 | Dawson | H04L 12/2697 714/703 |
| 7,421,734 B2 * | 9/2008 | Ormazabal | H04L 63/02 709/224 |
| 7,826,381 B1 | 11/2010 | Kastuar et al. | |

(Continued)

FOREIGN PATENT DOCUMENTS

| | | |
|---|---|---|
| CN | 102929690 A | 2/2013 |
| CN | 102148727 B | 8/2013 |

(Continued)

OTHER PUBLICATIONS

"Daemon (Computing", Last updated Feb. 10, 2015, Wikipedia, the Free Encyclopedia, 4 pages [Online], [Retrieved Mar. 9, 2015],Retrieved from the Internet, < http://en.wikipedia.org/wiki/Daemon_(computing) >.

(Continued)

*Primary Examiner* — Nirav B Patel
(74) *Attorney, Agent, or Firm* — Fenwick & West LLP (57) ABSTRACT

A determination is made regarding whether a firewall will block a network packet. The network packet indicates a set of one or more characteristics. A test packet is generated that indicates the set of characteristics. The test packet is sent to the firewall without using a network. A test result is received from the firewall. The test result is stored.

20 Claims, 5 Drawing Sheets

(56) References Cited

U.S. PATENT DOCUMENTS

| | | | |
|---|---|---|---|
| 2003/0152078 A1* | 8/2003 | Henderson | H04L 29/06 370/389 |
| 2004/0199792 A1 | 10/2004 | Tan et al. | |
| 2005/0076238 A1* | 4/2005 | Ormazabal | H04L 43/0894 726/4 |
| 2009/0165078 A1 | 6/2009 | Samudrala et al. | |
| 2010/0050229 A1 | 2/2010 | Overby | |
| 2010/0058340 A1 | 3/2010 | Kamada | |
| 2011/0078309 A1 | 3/2011 | Bloch et al. | |
| 2011/0209195 A1 | 8/2011 | Kennedy | |
| 2011/0296005 A1 | 12/2011 | Labovitz et al. | |
| 2012/0131164 A1 | 5/2012 | Bryan et al. | |
| 2012/0155290 A1 | 6/2012 | Dantressangle et al. | |
| 2012/0210425 A1 | 8/2012 | Porras et al. | |
| 2013/0044763 A1 | 2/2013 | Koponen et al. | |
| 2013/0176889 A1* | 7/2013 | Ogawa | H04L 43/10 370/252 |
| 2013/0318291 A1* | 11/2013 | Pepper | H04L 43/10 711/105 |
| 2014/0269347 A1* | 9/2014 | Gintis | H04L 43/50 370/244 |
| 2014/0269371 A1* | 9/2014 | Badea | H04L 63/0227 370/252 |
| 2014/0269380 A1* | 9/2014 | Rusak | H04L 43/0811 370/252 |
| 2014/0310408 A1 | 10/2014 | Kirner et al. | |
| 2014/0310415 A1 | 10/2014 | Kirner et al. | |
| 2014/0373091 A1 | 12/2014 | Kirner et al. | |
| 2015/0016287 A1* | 1/2015 | Ganichev | H04L 45/586 370/252 |
| 2015/0058492 A1* | 2/2015 | Meloche | H04L 69/165 709/228 |

FOREIGN PATENT DOCUMENTS

| | | | | |
|---|---|---|---|---|
| EP | | 1119151 A2 | 7/2001 | |
| GB | | EP 2782311 | * 3/2013 | H04L 29/06 |
| WO | WO 2004/047407 A1 | | 6/2004 | |
| WO | WO 2007/027658 A2 | | 3/2007 | |
| WO | WO 2013/020126 A1 | | 2/2013 | |

OTHER PUBLICATIONS

"Hypervisor", Last updated Mar. 7, 2015, Wikipedia, the Free Encyclopedia, 8 pages, [Online], [Retrieved Mar. 9, 2015], Retrieved from the Internet, < http://en.wikipedia.org/wiki/Hypervisor >.

"JSON", Last updated Mar. 9, 2015, Wikipedia, the Free Encyclopedia, 16 pages, [Online], [Retrieved from the Internet Mar. 9, 2015], Retrieved from the Internet< http://en.wikipedia.org/wiki/JSON >.

"The Open Information Security Foundation—Suricata Downloads", OSF Open Information Security Foundation, 6 pages [Online], [Retrieved Mar. 9, 2015], Retrieved from the Internet, <http://www.openinfosecfoundation.org/index.php/download-suricata >.

"OSI Model", Last updated Mar. 9, 2015, Wikipedia, the Free Encyclopedia, 9 pages, [Online], [Retrieved Mar. 9, 2015], Retrieved from the Internet , < http://en.wikipedia.org/wiki/OSI_model >.

"Representational State Transfer", Last updated Mar. 7, 2015, Wikipedia, The Free Encyclopedia, 5 pages, [Online], [Retrieved Mar. 9, 2015], Retrieved from the Internet, < http://en.wikipedia.org/wiki/Representational_state_transfer >.

"Snort.Org", 2015, Cisco and/or its Affiliates, 7 pages, [Online], [Retrieved Mar. 9, 2015], Retrieved from the Internet, < https://www.snort.org/ >.

U.S. Appl. No. 14/527,372, filed Oct. 29, 2014, Kirner et al.

U.S. Appl. No. 14/528,879, filed Oct. 30, 2014, Kirner et al.

PCT International Search Report and Written Opinion for PCT/US14/63748, Mar. 11, 2015, 16 Pages.

PCT International Search Report and Written Opinion for PCT/US14/63239, Mar. 26, 2015, 22 Pages.

PCT International Search Report and Written Opinion for PCT/US14/54505, Jun. 26, 2015, 15 Pages.

Office Action for ROC (Taiwan) Patent Application No. 103138235, Aug. 27, 2015, 12 Pages.

* cited by examiner

DETERMINING, WITHOUT USING A NETWORK, WHETHER A FIREWALL WILL BLOCK A PARTICULAR NETWORK PACKET

RELATED APPLICATION

This application claims the benefit of U.S. Provisional Application No. 61/899,468, filed Nov. 4, 2013, which is incorporated by reference herein in its entirety.

BACKGROUND

1. Technical Field

The subject matter described herein generally relates to the field of firewalls and, in particular, to determining (without using a network) whether a firewall will block a particular network packet.

2. Background Information

A firewall receives network packets and processes them according to a set of rules. In particular, a firewall determines whether to block a received network packet or allow the received network packet to pass through the firewall. A stateful firewall maintains a connection state table that indicates the state of network connections (e.g., Transmission Control Protocol (TCP) streams or User Datagram Protocol (UDP) communication) traveling across the firewall. A stateful firewall processes a network packet based on rules and based on the connection state table. For example, if the connection state table includes an entry for a particular active network session, then a network packet associated with that session is automatically allowed to pass through the firewall.

A stateful firewall's rules can change over time, such that a network packet allowed through the firewall based on the old rules should now be blocked based on the new rules. However, if that network packet is associated with an active session represented by an entry in the connection state table, then that packet will be allowed through the firewall even though it violates the new rules. So, after a rule change, there are two options: One option is to drop all network connections (e.g., by clearing the connection state table). This first option is secure but can significantly disrupt executing applications. Another option is to continue allowing active network connections that were allowed under the old rules. This second option is a breach of the new rules, but executing applications are not affected.

SUMMARY

The above and other issues are addressed by a method, non-transitory computer-readable storage medium, and system for determining whether a firewall will block a network packet. The network packet indicates a set of one or more characteristics. An embodiment of the method comprises generating a test packet that indicates the set of characteristics. The method further comprises sending the test packet to the firewall without using a network. The method further comprises receiving a test result from the firewall. The method further comprises storing the test result.

An embodiment of the medium stores computer program modules executable to perform steps. The steps comprise generating a test packet that indicates the set of characteristics. The steps further comprise sending the test packet to the firewall without using a network. The steps further comprise receiving a test result from the firewall. The steps further comprise storing the test result.

An embodiment of the system comprises a non-transitory computer-readable storage medium storing computer program modules executable to perform steps. The steps comprise generating a test packet that indicates the set of characteristics. The steps further comprise sending the test packet to the firewall without using a network. The steps further comprise receiving a test result from the firewall. The steps further comprise storing the test result.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
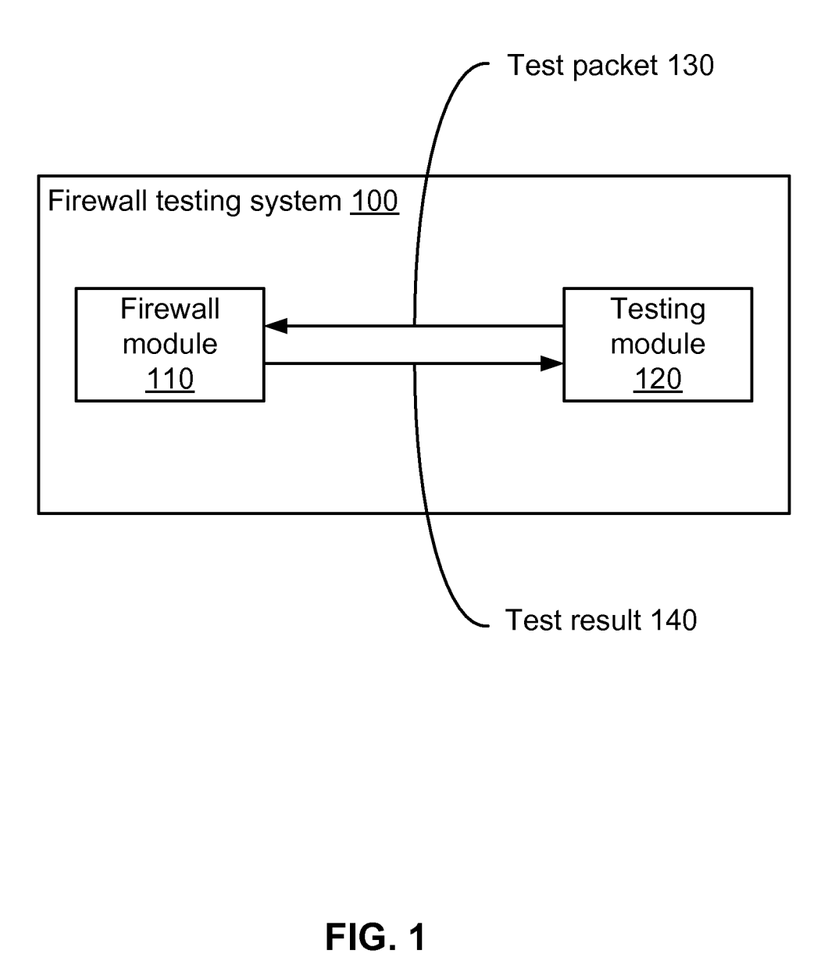
FIG. 1 is a high-level block diagram illustrating a firewall testing system for determining, without using a network, whether a firewall will block a particular network packet, according to one embodiment.

FIG. 1 is a high-level block diagram illustrating a firewall testing system 100 for determining, without using a network, whether a firewall (firewall module 110) will block a particular network packet, according to one embodiment. The firewall testing system 100 is hosted by a single computer 200 and includes a firewall module 110 and a testing module 120 that are communicatively coupled.

The firewall module 110 receives network packets (e.g., packets that adhere to the Internet Protocol (IP) standard) and processes them according to a set of rules. In particular, the firewall module 110 determines whether to block a received network packet or allow the received network packet to pass through the firewall module. The firewall module 110 can be of any type, such as a Linux firewall (e.g., the Netfilter Linux kernel module) or a Microsoft Windows firewall (e.g., Windows Firewall). The firewall module 110 is further described below with reference to FIG. 4.

The testing module 120 determines, without using a network, whether the firewall module 110 will block a particular network packet. The particular network packet indicates a set of one or more characteristics. In one embodiment, the set of characteristics includes a source IP address, a source port, a destination IP address, a destination port, and a communication protocol (e.g., TCP or UDP). Specifically, the testing module 120 generates a test packet 130, sends the test packet to the firewall module 110 without using a network, and receives a test result 140 from the firewall module. The testing module 120 is further described below with reference to FIG. 3.

The test packet 130 is similar to the particular network packet except that the test packet indicates that it is a test packet, thereby distinguishing itself from a non-test packet. In one embodiment, the test packet 130 indicates that it is a test packet by using the type of service (ToS) field in the packet's header. For example, the test packet 130 includes in the ToS field a first value to indicate that the packet is an outbound test (e.g., meant to mimic an outgoing packet) or a second value to indicate that the packet is an inbound test (e.g., meant to mimic an incoming packet). The test packet 130 also indicates that it should be processed by the firewall module's rules (even if the firewall module 110 is stateful and the test packet is associated with an active session represented by an entry in the connection state table). In one embodiment, the test packet 130 adheres to the TCP standard and indicates that it should be processed by the firewall module's rules by using the SYN flag in the packet's header. For example, the test packet's SYN flag indicates that the packet is the first packet in a new session. In one embodiment, the test packet 130 uses the time to live (TTL) field in the packet's header to prevent the test packet from entering a network. For example, the test packet 130 includes in the TTL field a value of 1 if the packet is an outbound test or a value of 2 if the packet is an inbound test.

The test result 140 includes the header of the test packet 130 and an indication of whether the firewall module 110 will block the particular network packet. For example, if the test packet 130 is a TCP/IP packet, then the test result 140 includes the TCP/IP header of the test packet. As another example, if the test packet 130 is a UDP/IP packet, then the test result 140 includes the UDP/IP header of the test packet. The indication of whether the firewall module 110 will block the particular network packet is, for example, a Boolean value indicating "block" or "allow."

Figure 2:
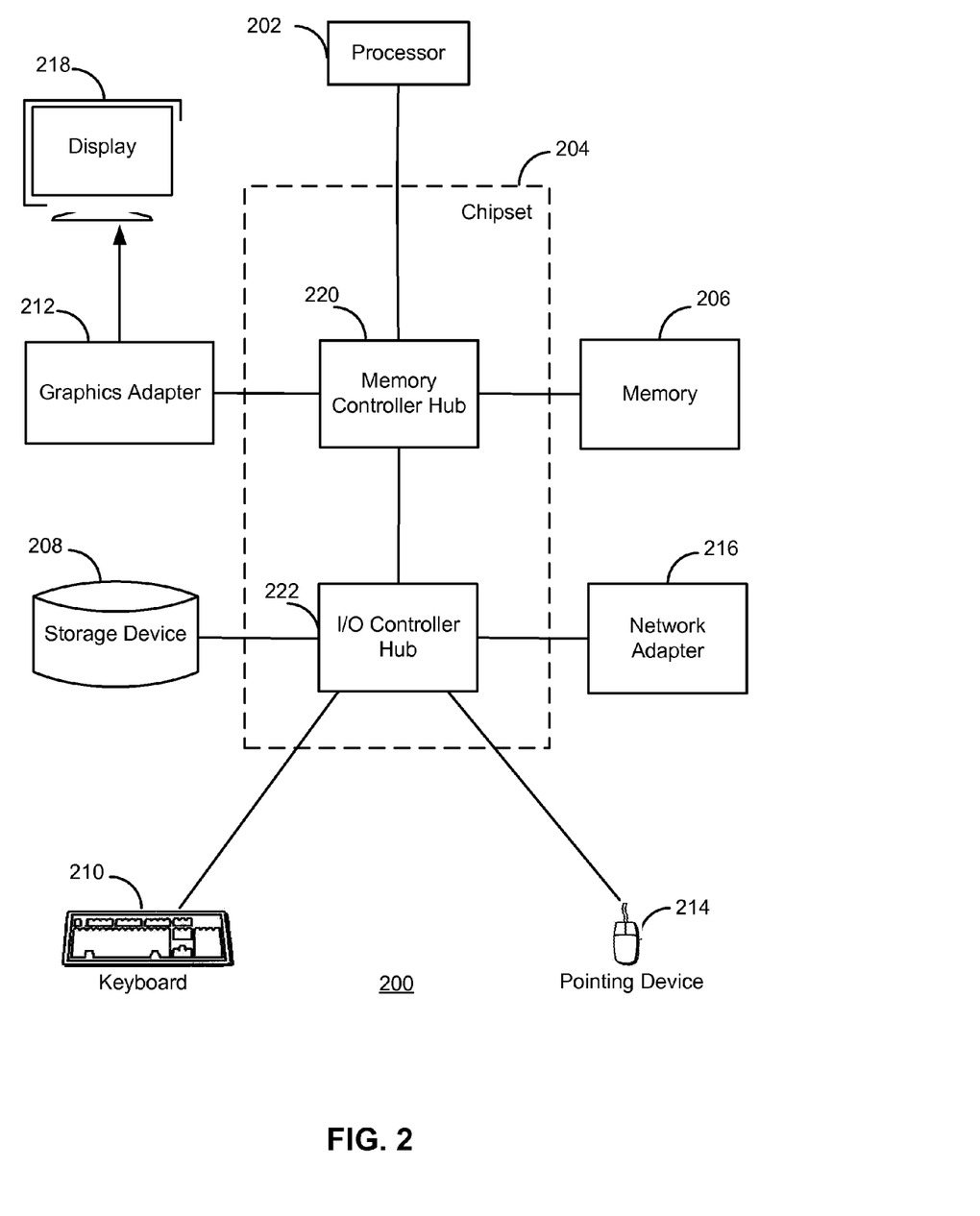
FIG. 2 is a high-level block diagram illustrating an example of a computer for use as the firewall testing system illustrated in FIG. 1, according to one embodiment.

FIG. 2 is a high-level block diagram illustrating an example of a computer 200 for use as the firewall testing system 100 illustrated in FIG. 1, according to one embodiment. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 includes one or more non-transitory computer-readable storage media such as a hard drive, compact disk read-only memory (CD-ROM), DVD, or a solid-state memory device. The memory 206 holds instructions and data used by the processor 202. The pointing device 214 is used in combination with the keyboard 210 to input data into the computer system 200. The graphics adapter 212 displays images and other information on the display device 218. In some embodiments, the display device 218 includes a touch screen capability for receiving user input and selections. The network adapter 216 couples the computer system 200 to the network 110. Some embodiments of the computer 200 have different and/or other components than those shown in FIG. 2. For example, the firewall testing system 100 can be formed of multiple blade servers and lack a display device, keyboard, and other components.

The computer 200 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

Figure 3:
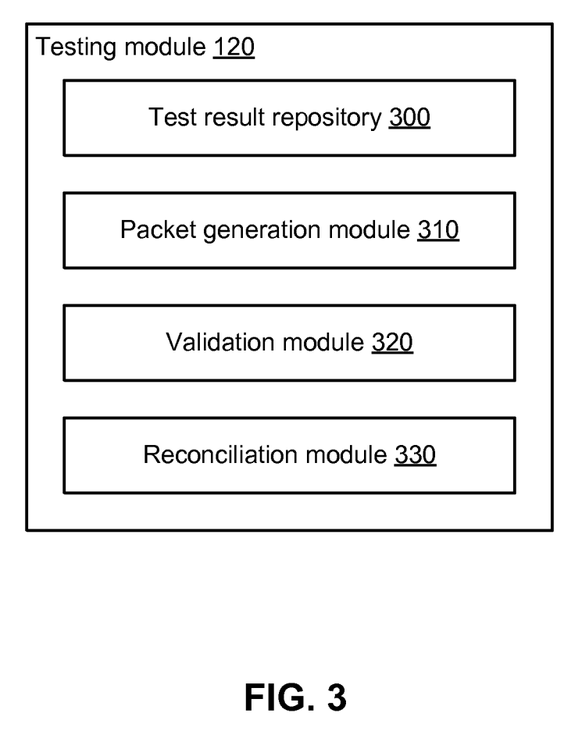
FIG. 3 is a high-level block diagram illustrating a detailed view of a testing module, according to one embodiment.

FIG. 3 is a high-level block diagram illustrating a detailed view of a testing module 120, according to one embodiment. The testing module 120 includes a test result repository 300, a packet generation module 310, a validation module 320, and a reconciliation module 330. The test result repository 300 stores one or more test results 140. For example, the test result repository 300 stores test results 140 that were previously sent from the firewall module 110 to the testing module 120.

The packet generation module 310 receives a set of one or more characteristics indicated by a target network packet and generates a network packet that indicates that set of characteristics. In one embodiment, the set of characteristics includes a target source IP address, a target source port, a target destination IP address, a target destination port, a target communications protocol, and a target direction (inbound or outbound). For example, the packet generation module 310 generates a network packet that adheres to the IP standard and the target communications protocol (e.g., TCP or UDP). In the IP header of the generated packet, the source IP address field contains the target source IP address, and the destination IP address field contains the target destination IP address. In the TCP header or the UDP header of the generated packet, the source port field contains the target source port, and the destination port field contains the target destination port. The generated packet also indicates that it is a test packet of the target direction. In one embodiment, the generated packet indicates that it is a test packet of the target direction by using the type of service (ToS) field in the packet's header, as described above in conjunction with the test packet 130. The generated packet also indicates that it should be processed by the firewall module's rules (even if the firewall module 110 is stateful and the test packet is associated with an active session represented by an entry in the connection state table), as described above in conjunction with the test packet 130. In one embodiment, the generated packet uses the time to live (TTL) field in the packet's header to prevent the test packet from entering the Internet, as described above in conjunction with the test packet 130.

The validation module 320 determines, without using a network, whether the firewall module 110 will block a particular network packet. For example, the validation module 320 receives a set of one or more characteristics indicated by the particular network packet. In one embodiment, the set of characteristics includes a target source IP address, a target source port, a target destination IP address, a target destination port, a target communications protocol, and a target direction (inbound or outbound). The validation module 320 generates a network packet that indicates the received set of characteristics. For example, the validation module 320 generates the network packet by executing the packet generation module 310.

The validation module 320 sends the generated packet to the firewall module 110 as a test packet 130 without using a network. For example, the validation module 320 binds the generated packet to a virtual network interface through which network applications (e.g., the firewall module 110 and the testing module 120) can communicate when executing on the same machine (e.g., the firewall testing system 100). The validation module 320 then sends the generated packet to the virtual network interface. The virtual network interface is implemented entirely within the operating system's networking software and passes no packets to any network interface controller. Any traffic that a computer program sends to a virtual network interface IP address is passed back up the network software stack as if the traffic had been received from another device. So, the validation module 320 sending the generated packet to the virtual network interface does not use a network. Specifically, the generated packet never travels outside the firewall testing system 100. In one embodiment, the firewall module 110 is a Linux firewall, and the virtual network interface is the Linux operating system's loopback interface.

The validation module 320 receives a test result 140 from the firewall module 110 and stores the test result in the test result repository 300.

Recall that a stateful firewall maintains a connection state table that indicates the state of network connections (e.g., TCP streams or UDP communication) traveling across the firewall. A stateful firewall's rules can change over time, such that a network packet allowed through the firewall based on the old rules should now be blocked based on the new rules. However, if that network packet is associated with an active session represented by an entry in the connection state table, then that packet will be allowed through the firewall even though it violates the new rules.

The reconciliation module 330 attempts to validate entries in a connection state table and removes entries that cannot be validated. For example, the reconciliation module 330 accesses the connection state table of the computer 200 hosting the firewall testing system 100 and iterates through the entries in the table. If the firewall module 110 is a Linux firewall, then the connection state table is provided by the connection tracking ("conntrack") tool. For a particular entry, the reconciliation module 330 determines, without using a network, whether the firewall module 110 will block a network packet that indicates the same set of characteristics as the particular entry. For example, the reconciliation module 330 executes the validation module 320 using the particular entry's set of characteristics as the input set of characteristics indicated by the particular network packet. If the test result 140 indicates that the firewall module 110 will not block (i.e., will allow) the network packet, then the reconciliation module 330 takes no action. If the test result 140 indicates that the firewall module 110 will block the network packet, then the reconciliation module 330 removes the entry.

In one embodiment, the reconciliation module 330 is executed after the firewall module's rules change. In this embodiment, the reconciliation module 330 determines, for a particular entry in the connection state table, whether the firewall module 110 will block a network packet that indicates the same set of characteristics as the particular entry according to the firewall module's newly-changed rules. If the test result 140 indicates that the firewall module 110 will not block (i.e., will allow) the network packet according to the newly-changed rules, then the reconciliation module 330 takes no action, and active network connections that do not violate the newly-changed rules are maintained. If the test result 140 indicates that the firewall module 110 will block the network packet according to the newly-changed rules, then the reconciliation module 330 removes the entry, and active network connections that violate the newly-changed rules are dropped.

Figure 4:
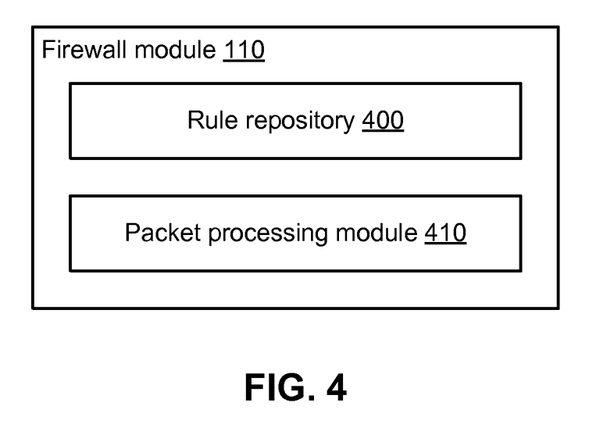
FIG. 4 is a high-level block diagram illustrating a detailed view of a firewall module, according to one embodiment.

FIG. 4 is a high-level block diagram illustrating a detailed view of a firewall module 110, according to one embodiment. The firewall module 110 includes a rule repository 400 and a packet processing module 410. The rule repository 400 stores one or more enforcement rules and one or more corresponding test rules. An enforcement rule is a conventional firewall rule that instructs the firewall module 110 regarding how to process a received network packet. In particular, an enforcement rule instructs the firewall module 110 regarding whether to block a received network packet or allow the received network packet to pass through the firewall module. A test rule is similar to an enforcement rule except that the test rule causes the firewall module 110 to send a test result 140 to the testing module 120 and to drop the network packet (i.e., not allow the network packet to pass through the firewall module). In one embodiment, the rule repository 400 includes a corresponding test rule for each enforcement rule.

The packet processing module 410 receives a network packet, determines whether the packet is a test packet, and processes the packet according to rules stored in the rule repository 400 (and according to a connection state table, if the firewall module 110 is stateful). For example, the packet processing module 410 determines whether the received packet is a test packet by inspecting the packet (e.g., to find an indication that the packet is a test packet, such as a special value in the type of service field) and/or based on whether the packet was received on the loopback interface (if the firewall module 110 is a Linux firewall). If the packet is not a test packet, then the packet processing module 410 processes the packet according to enforcement rules stored in the rule repository 400 (and according to a connection state table, if the firewall module 110 is stateful). The triggering of an enforcement rule causes the packet processing module 410 to block the packet or allow the packet to pass through the firewall module 110.

If the packet is a test packet, then the packet processing module 410 processes the packet according to test rules stored in the rule repository 400 (and according to a connection state table, if the firewall module 110 is stateful). When the packet processing module 410 initially receives the test packet, the packet appears to be an outbound packet. After the packet processing module 410 determines that the packet is a test packet, the packet processing module determines the direction of the packet (outbound test packet or inbound test packet). If the packet is an outbound test packet, then the packet processing module 410 begins processing the packet according to the test rules.

If the packet is an inbound test packet, then the packet processing module 410 accepts the packet, and the loopback interface mechanism sends the packet back into the firewall module 110. When the packet processing module 410 receives the test packet the second time, the packet appears to be an inbound packet. The packet processing module 410 determines that the packet is a test packet and, specifically, an inbound test packet. The packet processing module 410 then begins processing the packet according to the test rules.

The triggering of a test rule causes the packet processing module 410 to send a test result 140 to the testing module 120 and to drop the network packet (i.e., not allow the network packet to pass through the firewall module). The test result 140 includes the header of the test packet and an indication of whether the firewall module 110 will block a non-test packet that indicates the same set of characteristics as the test packet, as described above in conjunction with the test result 140. The packet processing module 410 sends the test result 140 to the testing module 120 in various ways. For example, if the testing module 120 is a user-level program, then the packet processing module 410 sends the test result 140 using a Netfilter log or ulog (if the firewall module 110 is a Linux firewall) or using Windows Filtering Platform and proprietary code (if the firewall module is a Windows firewall). If the testing module 120 is not a user-level program (e.g., a kernel module), then the packet processing module 410 sends the test result 140 in a different way.

Figure 5:
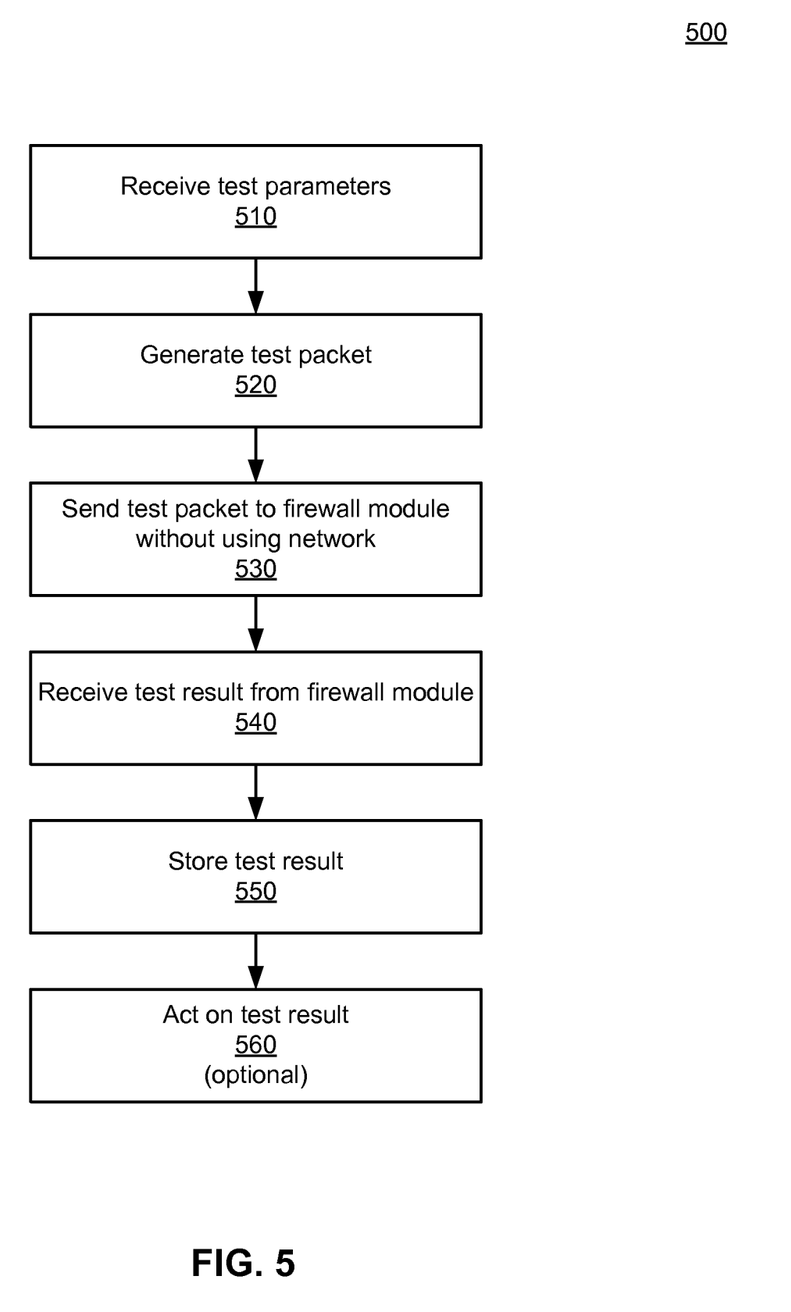
FIG. 5 is a flowchart illustrating a method of determining, without using a network, whether a firewall will block a particular network packet, according to one embodiment.

FIG. 5 is a flowchart illustrating a method 500 of determining, without using a network, whether a firewall (firewall module 110) will block a particular network packet, according to one embodiment. Other embodiments can perform the steps in different orders and can include different and/or additional steps. In addition, some or all of the steps can be performed by entities other than those shown in FIG. 3.

In step 510, test parameters are received. For example, the validation module 320 receives a set of one or more characteristics indicated by a particular network packet. In one embodiment, the set of characteristics includes a target source IP address, a target source port, a target destination IP address, a target destination port, a target communications protocol, and a target direction (inbound or outbound).

In step 520, a test packet 130 is generated. For example, the validation module 320 executes the packet generation module 310 to generate a test packet 130 that indicates the received set of characteristics.

In step 530, the test packet 130 is sent to the firewall module 110 without using a network. For example, the validation module 320 sends the test packet 130 to the firewall module 110 by binding the test packet 130 to the Linux operating system's loopback interface and sending the test packet to that loopback interface.

In step 540, a test result 140 is received from the firewall module 110. For example, the validation module 320 receives the test result 140.

In step 550, the test result 140 is stored. For example, the validation module 320 stores the test result 140 in the test result repository 300.

In step 560, which is optional, the test result 140 is acted on. For example, the testing module 120 displays the test result 140. As another example, the reconciliation module 330 removes an entry from a connection state table.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A method for validating connections of a firewall in response to changes to rules of the firewall, wherein the firewall determines whether to allow or block network packets based on the rules, the method comprising:
   receiving an indication of a change of rules of the firewall, the changed rules causing the firewall to block a network packet previously allowed by the firewall;
   accessing a set of connections of the firewall, the firewall configured to allow a network packet if the network packed is associated with an active session represented by a connection; and
   validating connections from the set, the validating comprising, for each connection:
   generating a test packet having a set of characteristics associated with the connection, the test packet indicating that the test packet should be prevented from entering the network;
   sending the test packet to the firewall without using a network;
   receiving a test result from the firewall; and
   responsive to the test result indicating that the firewall is configured to block non-test packets matching characteristics of the test packet, sending a request to remove the connection.

2. The method of claim 1, wherein the set of characteristics comprises a source Internet Protocol (IP) address, a source port, a destination IP address, a destination port, a communications protocol, and a direction.

3. The method of claim 2, wherein the direction comprises inbound or outbound.

4. The method of claim 1, wherein sending the test packet to the firewall without using the network comprises:
   binding the test packet to a virtual network interface; and
   sending the test packet to the virtual network interface.

5. The method of claim 1, wherein the test packet distinguishes itself from a non-test packet.

6. The method of claim 1, wherein the test packet distinguishes itself from a non-test packet by using a type of service field in the test packet's header.

7. The method of claim 1, wherein the test packet indicates that the test packet should be processed by a set of one or more firewall rules.

8. The method of claim 1, wherein the test packet indicates that the test packet should be processed by a set of one or more firewall rules by using a SYN flag in the test packet's header.

9. The method of claim 1, wherein the test packet uses a time to live field in the test packet's header to prevent the test packet from entering the network.

10. The method of claim 1, wherein the test result includes a header of the test packet and an indication of whether the firewall will block the network packet.

11. The method of claim 1, wherein the firewall maintains a connection state table, wherein an entry in the connection state table includes a particular set of characteristics for a particular connection, the particular set of characteristics matching characteristics of network packets allowed by the particular connection.

12. A non-transitory computer-readable storage medium storing computer program modules for validating connections of a firewall in response to changes to rules of the firewall, wherein the firewall determines whether to allow or block network packets based on the rules, the computer program modules executable to perform steps comprising:
   receiving an indication of a change of rules of the firewall, the changed rules causing the firewall to block a network packet previously allowed by the firewall;
   accessing a set of connections of the firewall, the firewall configured to allow a network packet if the network packed is associated with an active session represented by a connection; and
   validating connections from the set, the validating comprising, for each connection:
   generating a test packet having a set of characteristics associated with the connection, the test packet indicating that the test packet should be prevented from entering the network;
   sending the test packet to the firewall without using a network;
   receiving a test result from the firewall; and responsive to the test result responsive to the test result indicating that the firewall is configured to block non-test packets matching characteristics of the test packet, sending a request to remove the connection, sending a request to remove the connection.

13. The non-transitory computer-readable storage medium of claim 12, wherein the set of characteristics comprises a source Internet Protocol (IP) address, a source port, a destination IP address, a destination port, a communications protocol, and a direction.

14. The non-transitory computer-readable storage medium of claim 12, wherein sending the test packet to the firewall without using the network comprises:
 binding the test packet to a virtual network interface; and
 sending the test packet to the virtual network interface.

15. The non-transitory computer-readable storage medium of claim 12, wherein the test packet distinguishes itself from a non-test packet.

16. The non-transitory computer-readable storage medium of claim 12, wherein the test packet indicates that the test packet should be processed by a set of one or more firewall rules.

17. The non-transitory computer-readable storage medium of claim 12, wherein the test packet uses a time to live field in the test packet's header to prevent the test packet from entering the network.

18. The non-transitory computer-readable storage medium of claim 12, wherein the test result includes a header of the test packet and an indication of whether the firewall will block the network packet.

19. The non-transitory computer-readable storage medium of claim 12, wherein the firewall maintains a connection state table, wherein an entry in the connection state table includes a particular set of characteristics for a particular connection, the particular set of characteristics matching characteristics of network packets allowed by the particular connection.

20. A system for validating connections of a firewall in response to changes to rules of the firewall, wherein the firewall determines whether to allow or block network packets based on the rules, the system comprising:
 a non-transitory computer-readable storage medium storing computer program modules executable to perform steps comprising:
  receiving an indication of a change of rules of the firewall, the changed rules causing the firewall to block a network packet previously allowed by the firewall;
  accessing a set of connections of the firewall, the firewall configured to allow a network packet if the network packed is associated with an active session represented by a connection; and
  validating connections from the set, the validating comprising, for each connection:
   generating a test packet having a set of characteristics associated with the connection, the test packet indicating that the test packet should be prevented from entering the network;
   sending the test packet to the firewall without using a network;
   receiving a test result from the firewall; and
   responsive to the test result indicating that the firewall is configured to block non-test packets matching characteristics of the test packet, sending a request to remove the connection, sending a request to remove the connection; and
 a computer processor for executing the computer program modules.

* * * * *

UNITED STATES PATENT AND TRADEMARK OFFICE
CERTIFICATE OF CORRECTION

| | | |
|---|---|---|
| PATENT NO. | : 9,553,768 B2 | |
| APPLICATION NO. | : 14/531832 | |
| DATED | : January 24, 2017 | |
| INVENTOR(S) | : Jerry Boyd Scott et al. | |

It is certified that error appears in the above-identified patent and that said Letters Patent is hereby corrected as shown below:

In the Claims

Column 9 Line 1 after "responsive to the test result" delete "responsive to the test result".
Column 9 Line 4 after "packet," delete "sending a request to remove the connection,".
Column 10 Line 29 after "the test packet," delete "sending a request to remove the connection,".

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*